US006822623B2

(12) United States Patent
Kim et al.

(10) Patent No.: US 6,822,623 B2
(45) Date of Patent: Nov. 23, 2004

(54) HEAD MOUNTED DISPLAY

(75) Inventors: Sung-ha Kim, Suwon (KR); Chi-wang Son, Suwon (KR)

(73) Assignees: Samsung Electronics Co., Ltd., Suwon-si (KR); Aqpics Co., Ltd., Suwon-si (KR)

( * ) Notice: Subject to any disclaimer, the term of this patent is extended or adjusted under 35 U.S.C. 154(b) by 223 days.

(21) Appl. No.: 09/982,924

(22) Filed: Oct. 22, 2001

(65) Prior Publication Data
US 2002/0171605 A1 Nov. 21, 2002

(30) Foreign Application Priority Data
May 18, 2001 (KR) ........................................ 2001-27270

(51) Int. Cl.[7] ................................................. G09G 5/00
(52) U.S. Cl. ................................ 345/8; 345/7; 359/13; 359/632
(58) Field of Search ........................... 345/7–9; 359/13, 359/630–632

(56) References Cited

U.S. PATENT DOCUMENTS

| | | | | |
|---|---|---|---|---|
| 4,689,836 A | * | 9/1987 | Vitaloni | 2/424 |
| 5,347,400 A | * | 9/1994 | Hunter | 359/815 |
| 6,034,653 A | * | 3/2000 | Robertson et al. | 345/8 |
| 6,181,304 B1 | * | 1/2001 | Robinson et al. | 345/8 |
| 6,480,174 B1 | * | 11/2002 | Kaufmann et al. | 345/8 |
| 2002/0008677 A1 | * | 1/2002 | Saito | 345/8 |

* cited by examiner

*Primary Examiner*—Kent Chang
*Assistant Examiner*—Tom Sheng
(74) *Attorney, Agent, or Firm*—Staas & Halsey LLP

(57) ABSTRACT

A head mounted display (HMD) that is worn on a user's head to display an image. The head mounted display includes a display body to display the image, a frame to support the display body, the frame being worn on the user's head, and an adjusting portion to rotatably connect the display body with the frame, wherein the user adjusts a focal point of the image in accordance with a vertical position of the user's eyes by rotating the display body relative to the frame.

10 Claims, 5 Drawing Sheets

HEAD MOUNTED DISPLAY

CROSS-REFERENCE TO RELATED APPLICATIONS

This application claims the benefit of Korean Application No. 2001-27270, filed May 18, 2001, in the Korean Industrial Property Office, the disclosure of which is incorporated herein by reference.

BACKGROUND OF THE INVENTION

1. Field of the Invention

The present invention relates to a head mounted display, and more particularly, to a head mounted display capable of upward and downward adjusting of a position of a focal point of an image reproduced by a display body according to a position of a user's eyes.

2. Description of the Related Art

A head mounted display (HMD) is worn on a user's head for displaying an image. Generally, the head mounted display is classified into a helmet type or a goggles type, depending on how the display is worn on the user's head.

FIG. 1 shows a goggles type head mounted display 10. The head mounted display 10 includes a frame 11 having a wearing member 12, which is worn on the user's head, and a display body (not shown) disposed in the frame 11 to reproduce an image such as a motion picture or a still picture, corresponding to electric and data signals that are externally inputted through a leading wire 14. The head mounted display 10 is worn on the user's head in a manner that the wearing member 12 of a shape of a goggles' arm is hung over the user's ear. Accordingly, an ocular lens 13 on the frame 11 is positioned over the eyes of the user.

Furthermore, the display body is provided with a predetermined optical system therein (not shown), which includes a light source, image producing means, a plurality of lenses, a reflecting mirror, and an optical element. Accordingly, the display body is capable of reproducing an image, corresponding to signals inputted through the leading wire 14.

Due to differences in facial profiles of individuals, such as eye, nose and ear relative positions and shapes, the position of the image varies between different people.

In the conventional head mounted display 10, the wearing member 12 and the display body are fixed at an external side and an inner side of the frame 11, respectively. Thus, as shown in FIG. 2, due to the differing facial profiles, a focal point of the image may be inaccurately positioned and does not coincide with pupils of the user's eyes 50. Therefore it is difficult for the user to view the whole displayed image properly.

Accordingly, the user is required to directly move the frame 11 or the wearing member 12 upwardly and downwardly by a predetermined distance "D" with his/her hand. That is, the user has to move the frame 11 or the wearing member 12 in the direction of the dot-lined arrow of FIG. 2 in order to make the focal point of the image coincide with the pupil of the user's eyes 50. This method is inconvenient because the user is required to support the frame 11 or the wearing member 12 while viewing the image to maintain the focal point of the image at a predetermined position.

SUMMARY OF THE INVENTION

Accordingly, it is an object of the present invention to provide a head mounted display capable of upward and downward adjusting of a focal point of an image reproduced by a display body according to a position of a user's eyes.

Additional objects and advantages of the invention will be set forth in part in the description which follows and, in part, will be obvious from the description, or may be learned by practice of the invention.

The foregoing and other objects of the present invention are achieved by providing a head mounted display including a display body to reproduce an image, a frame to support the display body, the frame being worn on a user's head, and an adjusting portion to rotatably connect the display body with the frame, wherein the user adjusts a focal point of the image in accordance with a vertical position of the user's eyes by rotating the display body. The display body is rotated to a user's selected position by the adjusting portion and then is maintained at the user's selected position.

The adjusting portion includes a first connection portion having a first hinge opening formed therein, the first connection portion protruding from the display body, a second connection portion having a second hinge opening corresponding to the first hinge opening, the second connection portion protruding from a position of the frame corresponding to the first connection portion, and a hinge pin forcedly fitted into the first and the second hinge openings, thereby connecting the display body with the frame.

An upper surface of the display body and a lower surface of the second connection portion of the frame are oppositely disposed at a predetermined distance. The upper surface of the display body and the lower surface of the frame are in contact with each other during the rotation of the display body such that a rotation angle of the display body is limited within a predetermined rotation angle.

Also, a cover portion protrudes from the upper surface of the display body to screen the adjusting portion from the outside.

BRIEF DESCRIPTION OF THE DRAWINGS

These and other objects and advantages of the invention will become apparent and more readily appreciated from the following description of the preferred embodiments, taken in conjunction with the accompanying drawings, of which.

DETAILED DESCRIPTION OF THE PREFERRED EMBODIMENTS

Figure 1:
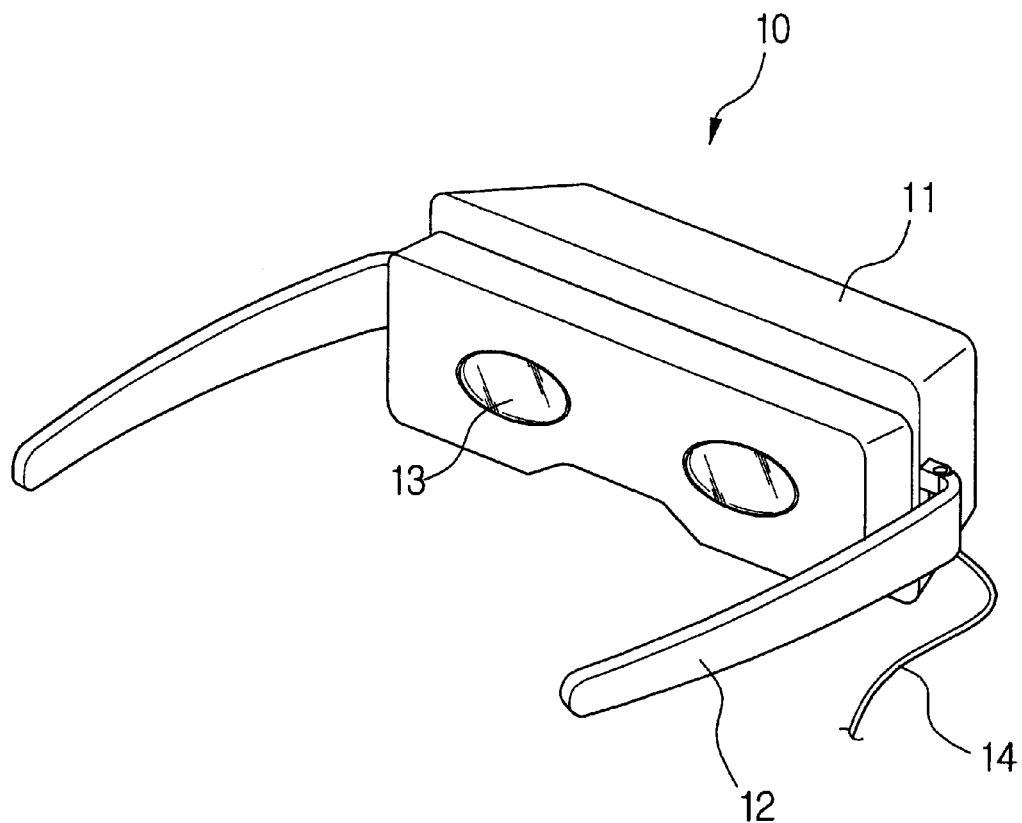
FIG. 1 is a perspective view showing a conventional head mounted display.
Figure 2:
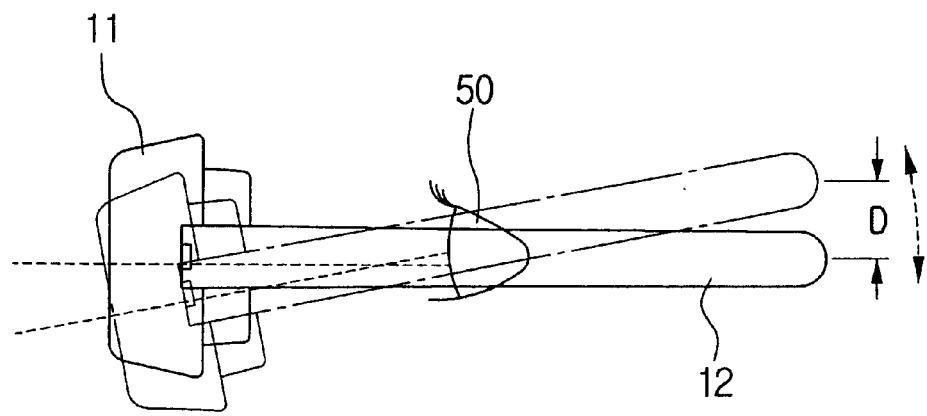
FIG. 2 is a side sectional view showing the head mounted display of FIG. 1, worn on a user's head.

Reference will now be made in detail to the present preferred embodiments of the present invention, examples of which are illustrated in the accompanying drawings, wherein like reference numerals refer to like elements throughout.

Figure 3:
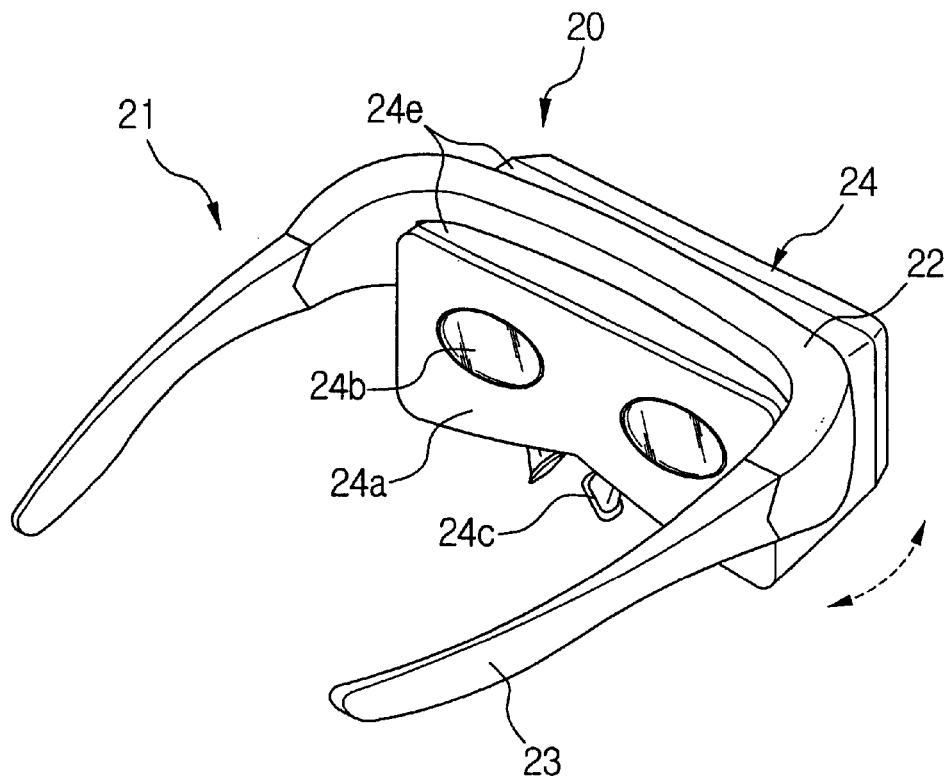
FIG. 3 is a perspective view showing a head mounted display according to a first embodiment of the present invention.

As shown in FIG. 3, according to a first embodiment of the present invention, a head mounted display 20 includes a display body 24 to reproduce an image corresponding to an external input signal, a frame 21 to support the display body 24, which is worn on a user's head, and an adjusting portion 26 (shown in FIG. 4) to connect the display body 24 to the frame 21 and to rotate the display body 24 in a direction of the dot-lined arrow.

The display body 24 receives an external electric signal and data through a leading wire 14 (refer to FIG. 1) and reproduces an image corresponding to the data. The display body 24 includes a display body casing 24a and an image reproduction portion (not shown) built into the display body casing 24a.

The display body casing 24a is provided with ocular lenses 24b disposed on a sidewall facing the user's eyes when the user wears the head mounted display 20 on his/her head. The image reproduced through the image reproduction portion is displayed on the ocular lenses 24b. Also, there are nose pads 24c provided under the ocular lenses 24b to be placed on the user's nose.

The image reproduction portion has a predetermined optical system (not shown) built therein to display the image. The optical system includes a light source, image producing means such a Liquid Crystal Display (LCD) monitor to produce the image corresponding to a ray generated from the light source, a plurality of lenses, a reflecting mirror, and an optical element. Here, the plurality of lenses, the reflecting mirror, and the optical element generate an optical path for the ray that is projected from the light source to the image producing means and another optical path through which the image is projected to the user's eyes. Since the optical system is generally used for the head mounted display 20, the description of the optical system structure is omitted.

The frame 21 supports the display body 24 and is worn on the user's head. The frame 21 includes a supporting portion 22 to support the display body 24 and a wearing member 23 connected to the supporting portion 22 to be worn on the user's head. The wearing member 23 can be fabricated into various shapes such as a hair band, a goggles' arm, or a helmet. As shown in FIG. 3, the head mounted display 20 employs the wearing member 23 in the shape of goggles' arms. Meanwhile, although the wearing member 23 may be integrally formed with the supporting portion 22, the wearing member 23 should not be limited to this embodiment and may be connected to the supporting portion 22 as in the conventional art.

Figure 4:
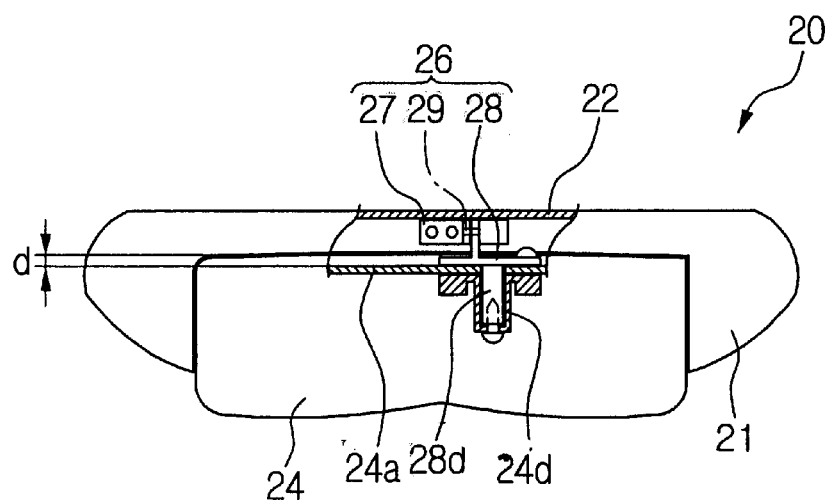
FIG. 4 is a partially cutaway elevation view showing the head mounted display of FIG. 3.

As shown in FIG. 4, the display body 24 and the frame 21 are rotatably connected to each other by the adjusting portion 26. That is, according to the present invention, the display body 24 and the frame 21 are rotatably connected to each other by the adjusting portion 26 such that the user can rotate the display body 24 relative to the frame 21 to move the focal point of the image upward and downward and thus adjust the focal point.

Furthermore, the display body 24 is connected to the frame 21 such that an upper surface of the display body 24 adjacent to the adjusting portion 26 and a lower surface of the supporting portion 22 adjacent to the adjusting portion 26 are oppositely disposed from each other at a predetermined distance "d". Due to the presence of the distance "d", the display body 24 is restrained from rotating at a larger angle than a predetermined rotation angle. If the display body 24 rotates at a larger angle than the rotation angle, the upper surface of the display body 24 and the lower surface of the supporting portion 22 of the frame 21 are in line or surface contact with each other. Thus, a complete deviation of the image display from the user's visual field due to rotation of the display body 24 is prevented because rotation cannot exceed the predetermined rotation angle. Also, a fatigue stress generation at the adjusting portion 26 is prevented. The rotation angle is limited to approximately 14°. The rotation of the display body 24 at the limited angle of 14° brings about the same effects of focal point adjustment as that of an upward and downward movement of a leading end of the wearing member 23 within about 40 mm. The adjustment of the rotation angle can be accomplished by adjusting the distance "d". If the distance "d" is increased, the rotation angle is increased accordingly, whereas, if the distance "d" is shortened, the rotation angle is decreased accordingly.

A cover portion 24e (refer to FIG. 3) is provided protruding from a top of the display body 24, to screen the adjusting portion 26 from being exposed to the outside. Due to the presence of the cover portion 24e, the adjusting portion 26 is not directly exposed to the outside even when the display body 24 is rotated. Accordingly, the adjusting portion 26 is shielded from impurities thereby improving the durability of the product. The cover portion 24e may also be formed at the supporting portion 22 of the frame 21 adjacent to the adjusting portion 26 Whenever the adjusting portion 26 is installed, the cover portion 24e is formed to screen the adjusting portion 26 from the outside when the adjusting portion 26 is at an installed position or when the display body 24 is rotated.

Figure 5:
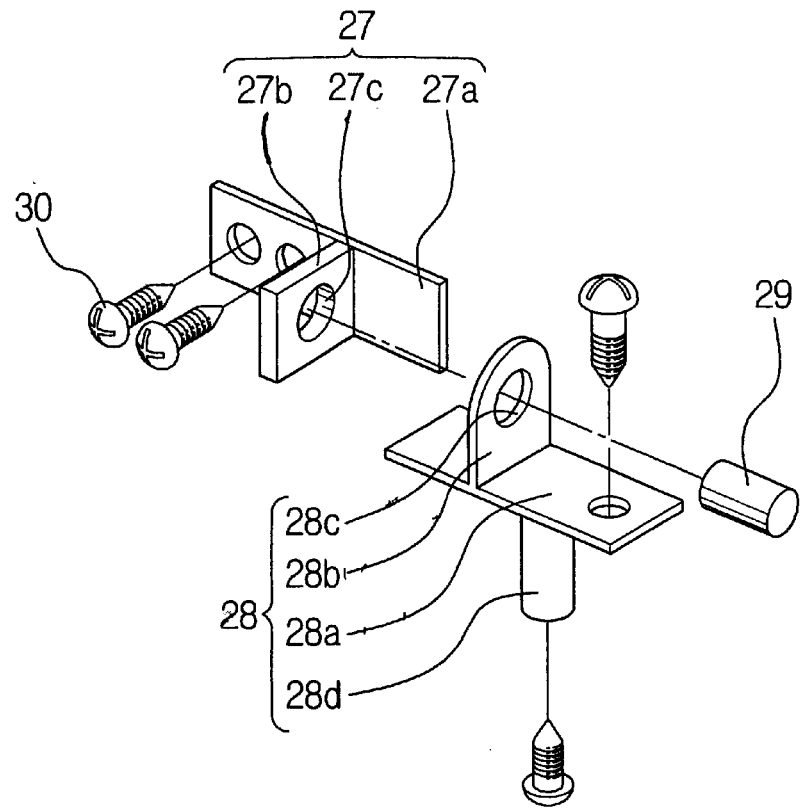
FIG. 5 is an exploded perspective view showing the adjusting portion of FIG. 4.

As shown in FIG. 5, the adjusting portion 26 includes a hinge assembly body. The hinge assembly body includes a first hinge portion 28 connected to the display body 24, a second hinge portion 27 connected to the frame 21, and a hinge pin 29. The first hinge portion 28 comprises a first connection portion 28b protruding from the upper surface of the display body 24 and a first hinge opening 28c formed in the first connection portion 28b. The second hinge portion 27 comprises a second connection portion 27b protruding from the frame 21 to correspond to the first connection portion 28b and a second hinge opening 27c formed in the second connection portion 27b. The hinge pin 29 is fitted into the first and the second hinge openings 28c and 27c.

The first connection portion 28b protrudes upward from a first plate 28a connected to the upper surface of the display body 24 substantially in a perpendicular relation with the first plate 28a. The second connection plate 27b protrudes substantially in a perpendicular direction from a second plate 27a connected to a position of the frame 21 adjacent to the display body 24. The first hinge portion 28 and the second hinge portion 27 are respectively secured to the display body 24 and the frame 21 by a fastening means 30, such as screws.

Furthermore, the first plate 28a is disposed at a lower portion of the second plate 27a in a perpendicular relation to the second plate 27a. There is a gap between an upper surface of the first plate 28a and a lower surface of the second plate 27a. The gap is wider than the distance "d" (refer to FIG. 4) between the upper surface of the display body 24 and the lower surface of the frame 21. Also, when contacting faces of the first connection portion 28b and the second connection portion 27b, a width of the contacting face of the first connection portion 28b is shorter than a width of the second connection portion 27b. The first connection portion 28b has a rounded portion at an upper circumference thereof such that the upper circumference of the first connection portion 28b does not contact the second plate 27a during the rotation of the display body 24. Accordingly, the display body 24 and the frame 21 can be rotated together without interfering with each other.

The first plate 28a includes a guide protrusion 28d formed at a lower surface thereof to be inserted into a guide recess 24d (refer to FIG. 4) formed on the display body 24. The guide protrusion 28a is fitted into the guide recess 24d such that contacting faces of the first plate 28a and the display body 24 are widened. Thus, the display body 24 is securely connected with the first plate 28a. The guide protrusion 28d and the guide recess 24d may be formed at the second plate 27a and the supporting portion 22, respectively.

The adjusting portion 26 can be constructed in various ways that the connection portion 28b and the second connection portion 27b protrude integrally from circumferences of the display body 24 and the frame 21 without the first plate 28a and the second plate 27a, and the hinge pin 29 is formed integrally with the first connection portion 28b or the second connection portion 27b to be inserted into the first and the second hinge openings 28c and 27c.

The display body 24 pivots on the hinge pin 29 to a user's selected position and then is maintained at the user's selected position. In order to maintain the display body 24 at the user's selected position, the hinge pin 29 is forcedly inserted into the first and the second hinge openings 28c and 27c. Accordingly, there is a friction force generated between inner circumferential surfaces of the first and the second hinge openings 28c and 27c and an outer circumferential surface of the hinge pin 29. Unless the display body 24 is subjected to an external force greater than the friction force, the display body 24 can be maintained at the user's selected position without moving. Accordingly, in order to rotate the display body 24, the display body 24 or the frame 21 is required to be subjected to the greater force than the friction force. Methods to maintain the display body 24 at the user's selected position are not limited to that in which the hinge pin 29 is forcedly fitted into the hinge openings 27c and 28c. Various methods can be utilized such as providing a latching portion or an extra guide portion or the like corresponding to the first connection portion 28b or the second connection portion 27b and the hinge pin 29.

Figure 6A:
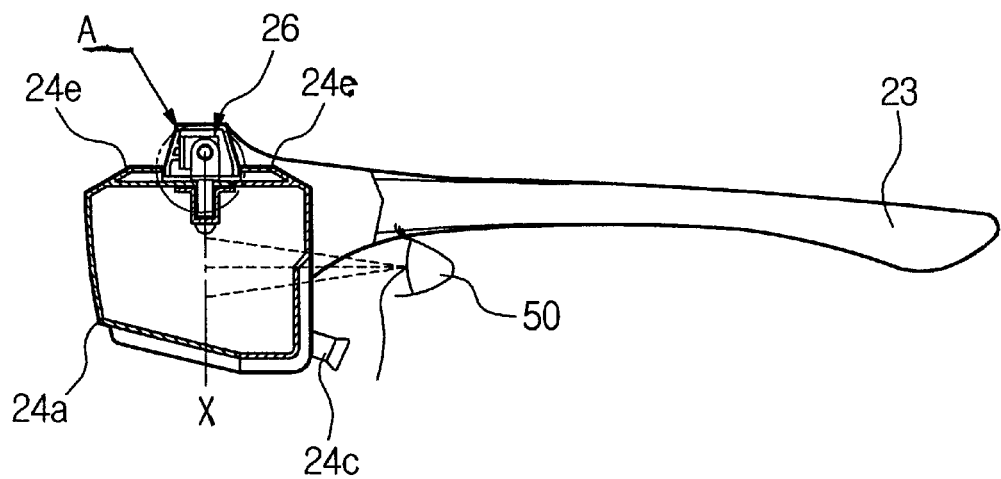
FIGS. 6A through 6D are cross sectional views showing operations of a head mounted display according to the present invention.

Operation of the head mounted display 20 constructed as described above is now described. As shown in FIG. 6A, if the head mounted display 20 is worn on the user's head in a normal state, a focal point "F" of the image reproduced through the display body 24 is positioned to correspond to the user's eyes 50.

Figure 6B:
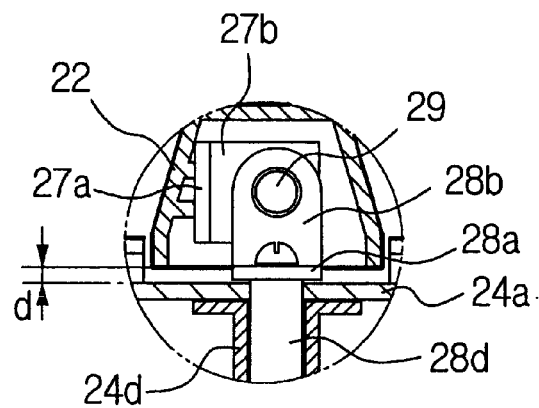

As shown in FIG. 6B, which is an enlarged view of portion 'A' of FIG. 6A, the display body casing 24a and the supporting portion 22 are rotatably connected to each other at the predetermined distance "d" from each other due to the hinge assembly body which includes the first and the second plates 28a and 27a and hinge pin 29.

Figure 6C:
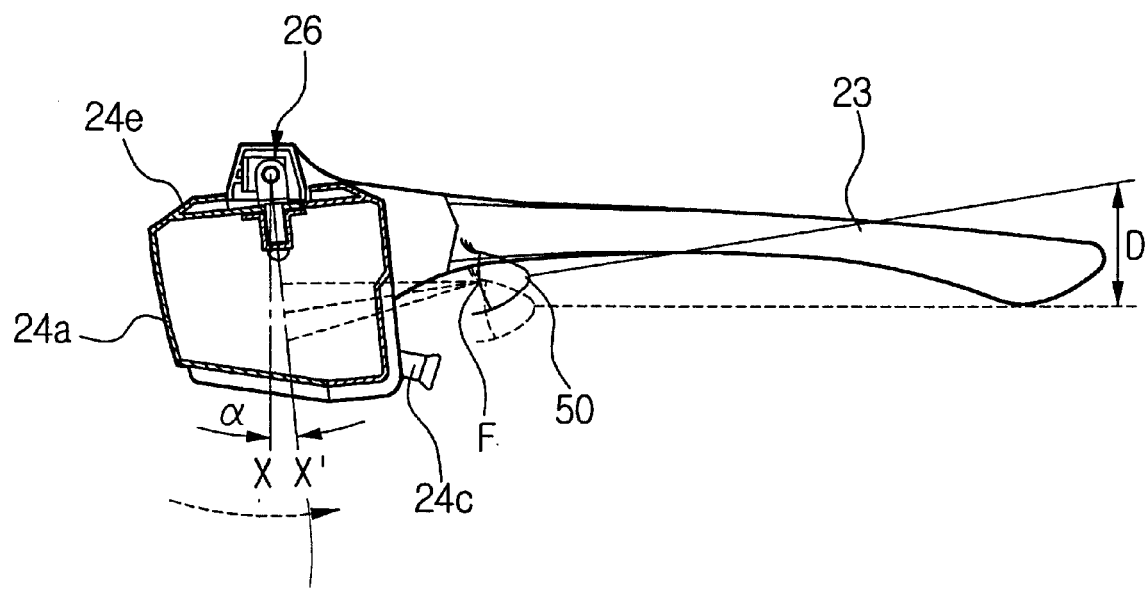

As shown in FIG. 6C, if the user's eyes 50 are higher than the focal point "F", the display body 24 is moved in a direction of the dot-lined arrow to position the focal point "F" to correspond to the user's eyes 50. Then, a first central axis "X" extending from a center of the frame 21 to be perpendicular to an axis between the two wearing members 23 moves at a predetermined rotation angle "α" to a second central axis "X'" extending downward from a center of the display body 24. Accordingly, a central portion of the ocular lenses 24b (refer to FIG. 3) is positioned closer to the user's eyes 50, and the focal point "F" of the image moves upwardly at the rotation angle "α" and is positioned to correspond to the user's eyes 50. The rotation of the display body 24 at the rotation angle "α" brings about an effect that could be obtained when the focal point "F" of the image is moved up at an end of the wearing member 23 by a predetermined distance "D". At this time, the rotation angle "α" is limited, i.e., the display body 24 is limited to rotate within about 7° such that the focal point F moves within the imaginary movement distance "D" of 20 mm at the end of the wearing member 23.

Figure 6D:
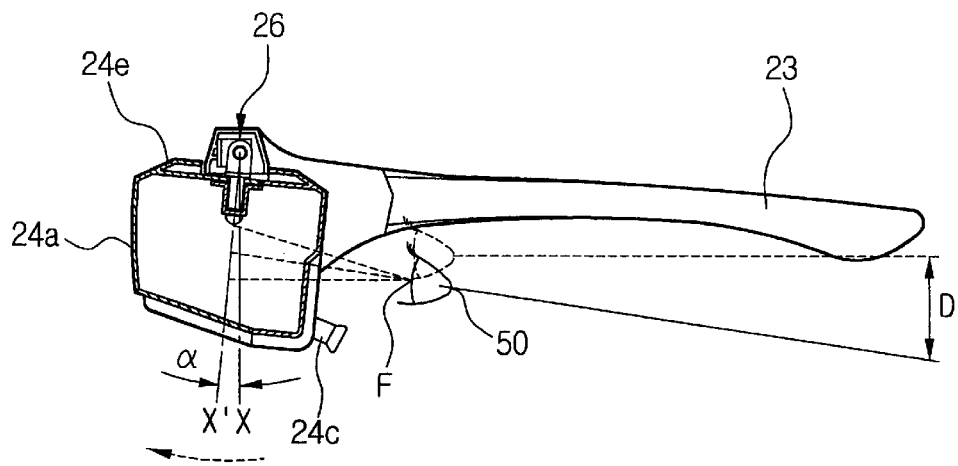

On the other hand, as shown in FIG. 6D, if the user's eyes 50 are lower than the focal point "F" of the image, the display body 24 is moved in a direction of the dot-lined arrow so that the focal point "F" is downwardly moved and positioned to correspond to the user's eyes 50. The rotation angle "α" is approximately 7° in this case and the imaginary movement distance "D" is within approximately 20 mm.

Also, the hinge pin 29 is forcedly fitted into the first and second hinge openings 28c and 27c such that the friction force is generated therebetween. Due to the friction force, the display body 24 is restricted from free rotation and maintained at the user's selected position.

Figure 7:
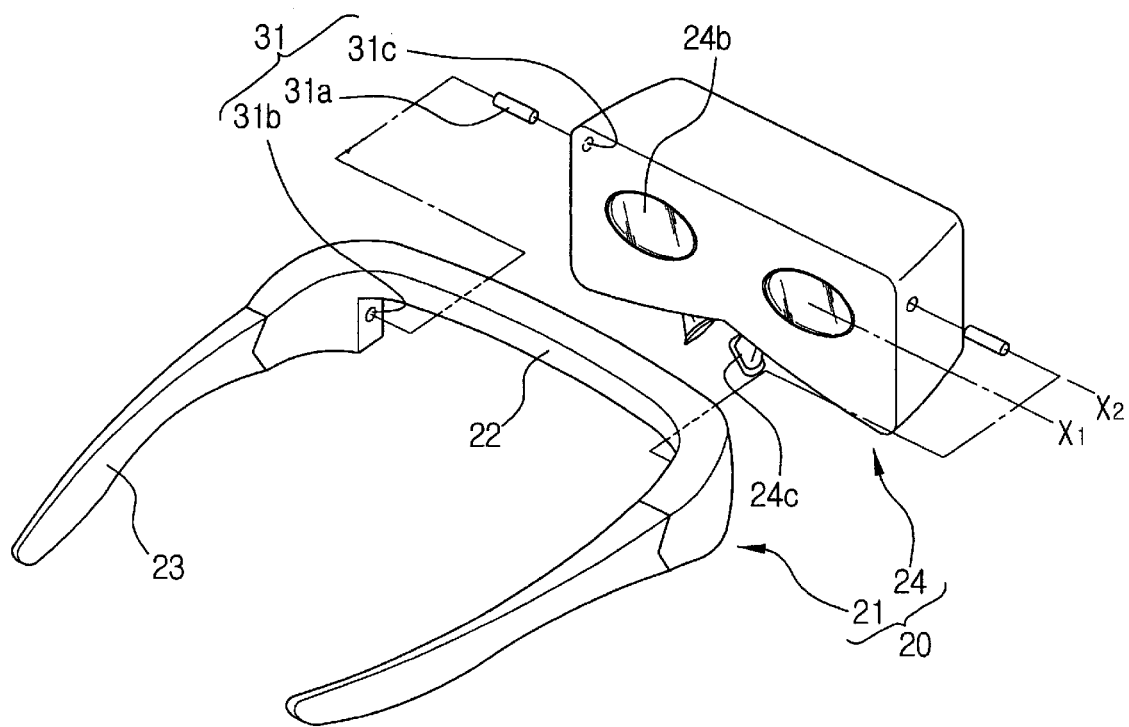
FIG. 7 is an exploded perspective view showing a head mounted display according to a second embodiment of the present invention.

FIG. 7 shows a head mounted display 20 according to a second embodiment of the present invention. According to the second embodiment, an adjusting portion 31, which rotatably connects a display body 24 to the frame 21, includes first recesses 31c formed at each side of the display body 24, second recesses 31b formed at each side wall of the frame 21 to correspond to the first recesses 31c, and rotary shafts 31a to rotatably connect the first recesses 31c with the second recesses 31b. An axis "$X_2$" between one of the first recesses 31c and the opposite first recess 31c is parallel to an axis "$X_1$" between one of the ocular lenses 24b and the other ocular lens 24b.

According to the construction as described above, the display body 24 rotates on the rotary shaft 31a such that the ocular lenses 24b approach to or depart away from the user's eyes 50, and the focal point "F" of the image can be easily adjusted. Also, the rotary shafts 31a are forcedly fitted into the first and second recesses 31c and 31b such that the display body 24 can be maintained at the user's selected position, to which the display body 24 is rotated.

Furthermore, it is possible that the rotary shafts 31a are integrally formed with the display body 24 or the frame 21 to be fitted into the second recesses 31b or the first recesses 31c. Furthermore, there can be various methods to connect the display body 24 with the frame 21 by making use of the rotary shafts 31a.

In order to limit the range of the rotation of the display body 24, the display body 24 is connected with the frame 21 in a manner that an upper surface of the display body 24 and a lower surface of the frame 21 are oppositely disposed away from each other by a predetermined distance as in the first embodiment. Accordingly, if the display body 24 is rotated at a greater angle than a pre-set rotation angle, the upper surface of the display body 24 and the lower surface of the frame 21 contact each other, thereby preventing excessive rotation of the display body 24.

Since operation of the head mounted display 20 according to the second embodiment of the present invention is identical to the operation aforementioned in the first embodiment, the description thereof is omitted.

According to the above embodiments of the present invention, due to the adjusting portion 26 or 31 provided to the head mounted display 20, the display body 24 can be rotated with respect to the frame 21. Accordingly, since the focal point "F" of the reproduced image can be adjusted upward and downward so as to be positioned to correspond to the user's eyes 50, the user can be provided with an image having the focal point "F" which is uniformly projected to the user's eyes 50 regardless of respective face profiles of users.

Unless the display body 24 rotated to the user's selected position is subjected to an additional force, the display body 24 can be maintained at the user's selected position. Accordingly, the user can view the reproduced image without having to continuously seize the head mounted display 20 to adjust the focal point "F".

Due to the presence of the cover portion 24e, which is provided to screen the connecting portions 27b and 28b from being exposed to the outside even during rotation of the display body 24, impurities cannot penetrate into the adjusting portion 26. Thus, the durability of the product is improved.

Although a few preferred embodiments of the present invention have been shown and described, it will be appreciated by those skilled in the art that changes may be made in these embodiments without departing from the principles and sprit of the invention, the scope of which is defined in the claims and their equivalents.

What is claimed is:

1. A head mounted display comprising:
   a display body to reproduce an image;
   a frame to support the display body, the frame being worn on a user's head; and
   an adjusting portion to rotatably connect the display body with the frame, the user adjusting a focal point of the image in accordance with a position of an eye of the user by rotating the display body, wherein the adjusting portion includes:
      a first connection portion having a first hinge opening formed therein, the first connection portion protruding from a first plate connected to the display body;
      a second connection portion having a second hinge opening corresponding to the first hinge opening, the second connection portion protruding from a second plate connected to the frame and corresponding to the first connection portion; and
      a hinge pin forcedly fitted into the first and second hinge openings.

2. The head mounted display of claim 1, wherein the display body is rotated to a position selected by the user and is maintained at the selected position by the adjusting portion.

3. The head mounted display of claim 2, wherein the adjusting portion includes:
   a first recess formed at a sidewall of the display body;
   a second recess formed at a sidewall of the frame corresponding to the first recess; and
   a rotary shaft forcedly fitted into the first recess and the second recess.

4. The head mounted display of claim 1, wherein the second connection portion is disposed on a lower surface of the frame, and an upper surface of the display body and the lower surface of the frame are disposed from each other at a predetermined distance.

5. The head mounted display of claim 4, wherein the upper surface of the display body and the lower surface of the frame are in contact with each other during rotation of the display body such that a rotation angle of the display body is limited to approximately 14°.

6. The head mounted display of claim 4, wherein a gap between an upper surface of the first plate and a lower surface of the second plate is wider than the predetermined distance.

7. The head mounted display of claim 4, wherein the first plate comprises a first guide protrusion inserted into a grade recess formed on the display body to securely connect the display body and the first plate.

8. The head mounted display of claim 7, wherein the guide protrusion and the guide recess widen a distance between contacting faces of the first plate and the display body.

9. The head mounted display of claim 1, further comprising a cover portion to screen the adjusting portion from an outside.

10. The head mounted display of claim 1, wherein the frame comprises:
    a first recess formed at a sidewall of the display body;
    a second recess formed at a sidewall of the frame, corresponding to the first recess; and
    a shaft forcedly fitted into the first and second recesses.

* * * * *